US010408332B2

(12) United States Patent
Pekarsky et al.

(10) Patent No.: US 10,408,332 B2
(45) Date of Patent: Sep. 10, 2019

(54) TRANSMISSION OIL FILTER WITH INTERNAL MAGNETS

(71) Applicant: Ford Global Technologies, LLC, Dearborn, MI (US)

(72) Inventors: Lev Pekarsky, West Bloomfield, MI (US); Kent Flory, Commerce Twp., MI (US); Ronald P. Kepner, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 438 days.

(21) Appl. No.: 15/358,667

(22) Filed: Nov. 22, 2016

(65) Prior Publication Data
US 2018/0142775 A1 May 24, 2018

(51) Int. Cl.
*F16H 57/04* (2010.01)
*B01D 35/06* (2006.01)
*F01M 11/00* (2006.01)
*B03C 1/033* (2006.01)
*B03C 1/28* (2006.01)
*B01D 35/027* (2006.01)

(52) U.S. Cl.
CPC ..... *F16H 57/0404* (2013.01); *B01D 35/0273* (2013.01); *B01D 35/06* (2013.01); *B03C 1/0332* (2013.01); *B03C 1/286* (2013.01); *F01M 11/0004* (2013.01); *B03C 2201/18* (2013.01); *B03C 2201/30* (2013.01); *F01M 2011/0029* (2013.01); *F01M 2011/0058* (2013.01)

(58) Field of Classification Search
CPC . F16H 57/0404; B01D 35/0273; B01D 35/06; B03C 1/286; B03C 1/0332; B03C 2201/30; B03C 2201/18; F01M 11/0004; F01M 2011/0029; F01M 2011/0058
See application file for complete search history.

(56) References Cited

U.S. PATENT DOCUMENTS

| 4,839,041 A | 6/1989 | Kuwayama et al. |
| 5,441,647 A | 8/1995 | Wascher et al. |
| 6,423,215 B1 | 7/2002 | Stein |
| 6,464,863 B1 * | 10/2002 | Nguyen ............... B01D 35/027 210/167.03 |
| 6,849,179 B1 * | 2/2005 | Taylor .................. B01D 35/027 184/6.24 |
| 8,679,334 B2 | 3/2014 | Becker et al. |
| 2013/0105379 A1 * | 5/2013 | Lee ........................ B01D 29/21 210/222 |
| 2013/0118964 A1 | 5/2013 | Dedering |

FOREIGN PATENT DOCUMENTS

| EP | 2578289 A1 | 4/2013 |
| KR | 200325384 Y1 | 9/2003 |
| KR | 100848068 B1 | 7/2008 |
| KR | 101091624 B1 | 12/2011 |

* cited by examiner

*Primary Examiner* — David A Reifsnyder
(74) *Attorney, Agent, or Firm* — Dave Kelley; Brooks Kushman P.C.

(57) ABSTRACT

A transmission oil filter includes a housing having a bottom cover defining a top side, a bottom side, and an inlet. A filter is disposed in the housing to filter contaminates and fines from the oil passing therethrough. One or more magnets is disposed on the top side surrounding the inlet so that oil passes by the one or more magnets when exiting the inlet to remove and trap fines from the passing oil. The bottom side has ridges disposed under the magnets to trap fines flowing under the housing.

20 Claims, 4 Drawing Sheets

TRANSMISSION OIL FILTER WITH INTERNAL MAGNETS

TECHNICAL FIELD

The present disclosure relates to oil filters for transmissions and to transmissions having the oil filter.

BACKGROUND

Automatic transmissions include metal components that rotate and engage with each other during operation. Over time, small metal shavings and pieces (commonly referred to as fines) are produced and contaminate the transmission fluid. The fines can cause damage to the valve body and clog the passageways of the hydraulic circuits if not properly contained.

Most automatic transmissions include a filter typically located in the sump for filtering the fines and other debris from the transmission fluid. The filter media is capable of filtering the fines, but over time, the fines can clog the filter media reducing the service life of the filter. As such, it is advantageous to trap the fines using a magnet or other means.

Many transmissions include a single magnet disposed on the oil pan to trap the fines. The surface area of the oil pan is much greater than that of the magnet and a significant amount of time is required for all of the fluid to pass through the magnet surface boundary so that the fluid born fines can be separated and trapped on the magnet. This slow process presents a significant disadvantage because many fines can freely circulate to the filter media and over time clog the filter. Further, the particle size of some of the fines is small enough to pass through the filter and negatively affect the sensitive electro-hydraulic components of the valve body.

This application discloses an oil filter that solves these and other problems as will be described below in more detail.

SUMMARY

According to one embodiment, a transmission oil filter includes a housing having a bottom cover defining a top side, a bottom side, and an inlet. A filter is disposed in the housing to filter contaminates and fines from the oil passing therethrough. One or more magnets are disposed on the top side surrounding the inlet so that oil passes by the one or more magnets when exiting the inlet to remove and trap fines from the passing oil. The bottom side has ridges disposed under the magnets to trap fines flowing under the housing.

The one or more magnets may be a single circular magnet that defines a central opening configured to receive oil therethrough. One or more of the magnets may include multiple sets of north and south poles to reduce the required thickness of the magnets.

The bottom cover may include a sunken portion that is recessed from a main portion. The sunken portion has a top surface supporting the one or more magnets and a bottom surface that defines the ridges. The inlet is defined by the sunken portion and extends between the top and bottom surfaces. The ridge may form a grid pattern on the bottom surface.

According to another embodiment, a transmission includes a case and an oil pan attached to the case and defining a sump. An oil filter is disposed in the sump and includes a bottom cover defining a top surface, a bottom surface, and an inlet. The bottom cover defines one or more magnet pockets that surround the inlet and are recessed from the top surface. One or more magnets are disposed in the pockets to remove and trap fines from the passing oil.

According to yet another embodiment, a transmission oil filter includes a housing having a bottom cover with a main portion and a sunken portion that defines an inlet. The sunken portion has a top side defining one or more magnet pockets that surround the inlet. A filter media is disposed in the housing. One or more magnets are disposed in the one or more pockets and surrounding the inlet. A bottom side of the sunken portion defines ridges disposed under the magnets.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
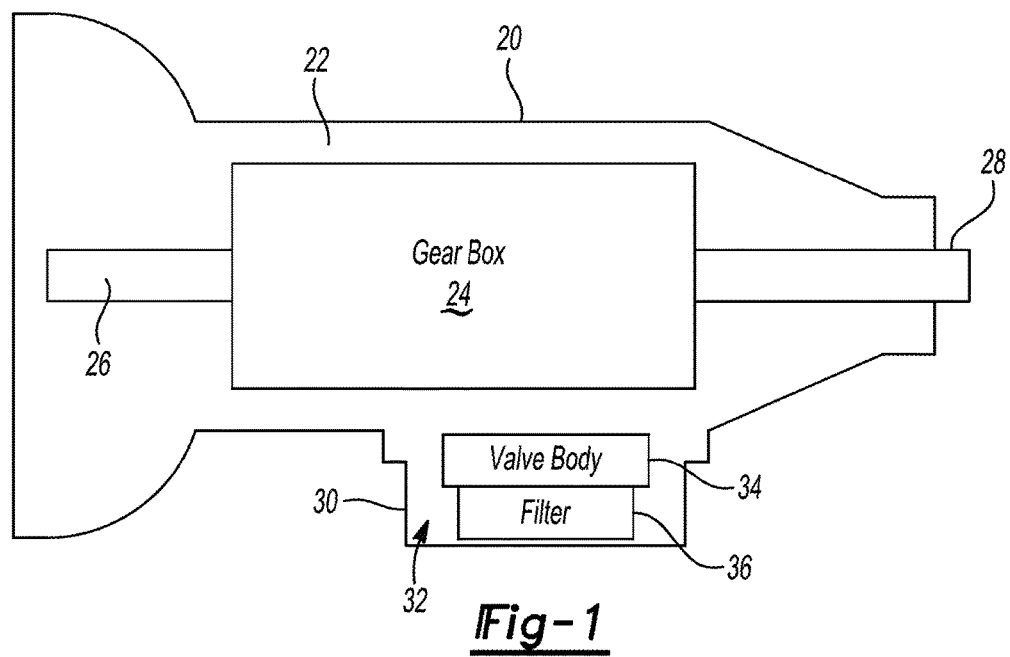
FIG. 1 is a schematic diagram of a transmission.

Referring to FIG. 1, the transmission 20 includes a housing 22 that defines an interior. A gear box 24 is disposed within the interior and includes gearing and clutches that cooperate to generate one or more speed ratios between the input shaft 26 and the output shaft 28. A valve body 34 may be disposed under the gearbox 24 and controls operation of the clutches. An oil pan 30 is connected to the housing 22 on a bottom side of the transmission 20. The oil pan 30 defines a sump 32 that holds transmission fluid, e.g. oil. A filter 36 is disposed in the sump 32 and includes an outlet connected to an intake of a transmission pump and an inlet that draws transmission fluid from the sump and into the filter 36. The filter 36 houses a filter media that conditions the oil for the valve body and the gear box. The filter media traps fines and other debris to prevent damaging the valve body and the hydraulic circuits of the gearbox.

Figure 2:
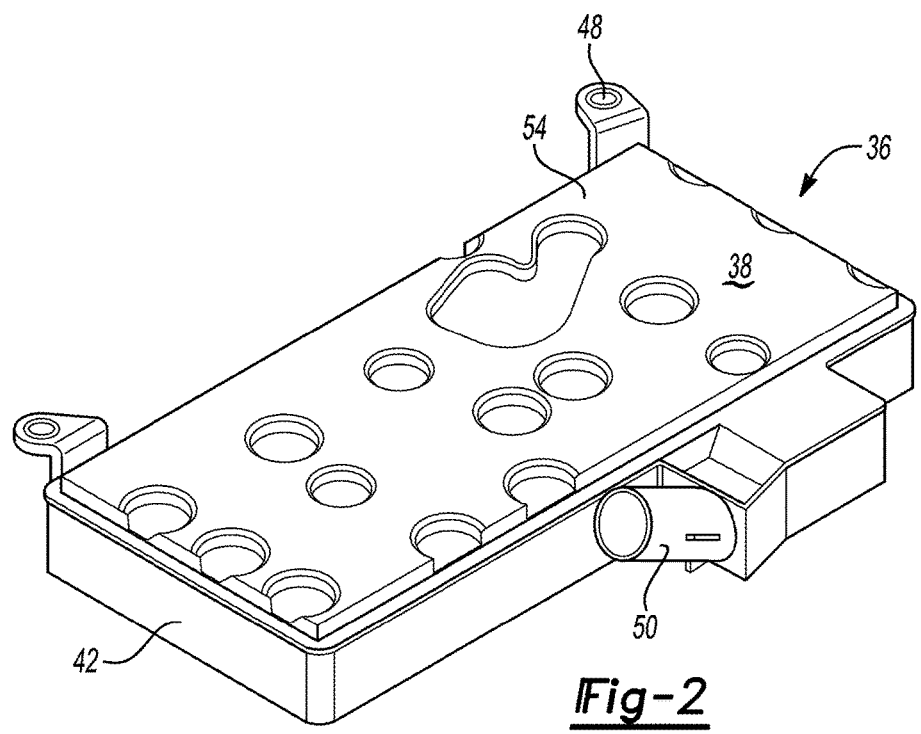
FIG. 2 is a perspective view of an oil filter for a transmission.
Figure 3:
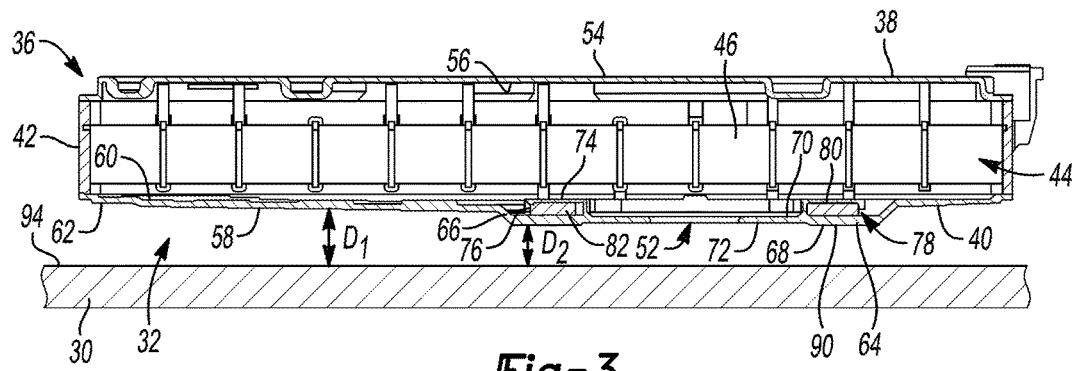
FIG. 3 is a cross-sectional view of the oil filter of FIG. 2 disposed above an oil pan.

The remaining figures and associated text describe example oil filters that may be used in transmissions such as transmission 20. Referring to FIGS. 2 and 3, the filter 36 includes a housing having a top cover 38, a bottom cover 40, and a plurality of sidewalls 42 that cooperate to define an enclosure 44. A filter media 46 is disposed within the enclosure 44 to filter the fines and debris from the oil passing through the filter. The housing may include attachment members 48 that are fastened to the valve body to secure the filter 36 within the sump 32. In the illustrated embodiment, the outlet 50 extends from one of the sidewalls 42, however, the outlet 50 may be defined in the top cover 38. The bottom cover 40 defines an inlet 52.

The top cover 38 includes a top surface 54 and a bottom surface 56. The bottom cover 40 includes a main portion 58 having a top side 60 and a bottom side 62, and including a sunken portion 64 having a bottom 68 that is recessed from the main portion 58 and angled wall 66 that extend between the main portion 58 and the bottom 68. The bottom 68 defines the top side 70 that faces the filter media 46 and a bottom side 72 that faces the oil pan 30. The inlet 52 is defined in the bottom 68.

Figure 4:
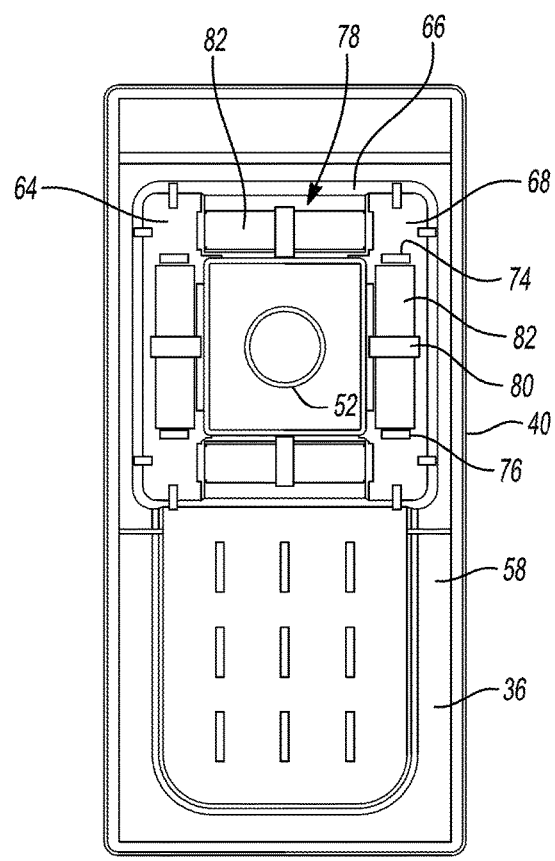
FIG. 4 is a top view of the bottom cover of the oil filter of FIG. 2.

Referring to FIGS. 3 and 4, the filter 36 includes one or more magnets 82 disposed within the enclosure 44. The magnets 82 are proximate the inlet 52 so that oil flowing through the inlet must pass through the magnet surface boundary. Placing the magnets 82 within the filter 36 is more effective than a magnet that is disposed on a surface of the oil pan because the oil must pass through the magnet surface boundary before entering the filter media 46. The magnets 82 may be located on the sunken portion 64 and secured by magnet holders 74. Each of the magnet holders 74 may include one or more sidewalls 76 that define a pocket 78 for receiving one of the magnets therein. The sidewalls 76 may be integrally formed with the sunken portion 64. Each of the magnet holders 74 may include a retention feature 80 that secures the magnet within the pocket 78. The retention feature 80 may be a clip, bracket, or similar feature.

The sunken portion 64 may be recessed from the main portion 58 such that a top surface of the magnets 82 is flush with or disposed below the top side 60. Recessing the magnets reduces flow obstructions within the filter and can improve flowrates between the inlet and outlets. Recessing the magnets also places the magnets closer to the oil pan 30. The filter housing is ideally formed from a non-magnetic material to prevent interfering with the magnetic field of the magnets. In one or more embodiments, the housing is formed of plastic.

One or more of the magnets may include multiple sets of north and south poles. This allows the magnet to have reduced thickness without demagnetization. Thinner magnets may provide less flow resistance than thicker magnets.

FIG. 4 illustrates four magnets surrounding the inlet 52. Used herein, "surrounding" does not require that the magnets completely encircle the inlet. As can be seen in the illustration, it is possible for oil to flow from the inlet without passing directly over a top surface of the magnets 82. However, the magnets cooperate to form a magnet field that does completely encircle the inlet so that oil exiting the inlet must flow through the magnetic field. This reduces the amount of fines coming in contact with the filter media 46, which can extend the life of the filter 36.

Figure 5:
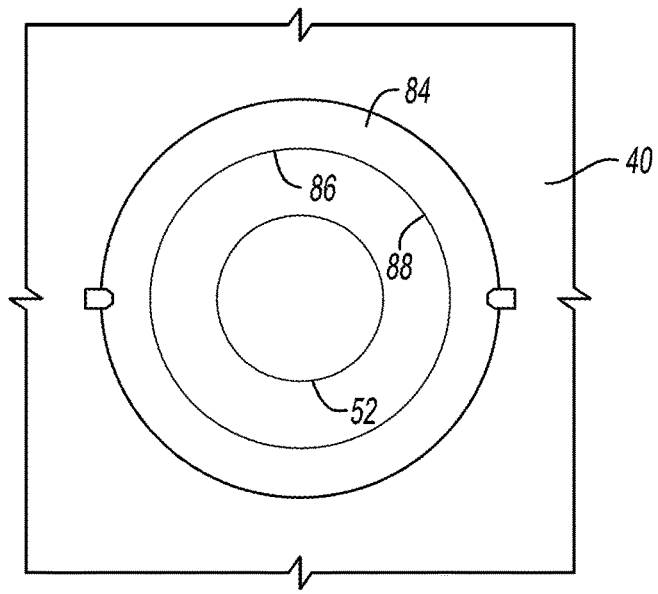
FIG. 5 is a top view of a bottom cover according to another embodiment.

FIG. 5 illustrates an embodiment in which a circular magnet 84 encircles the inlet 52. The magnet 84 includes an inner diameter 86 that defines a bore 88. The magnet 84 is arranged on the bottom cover 40 so that the inlet 52 is disposed within the bore 88. During operation of the transmission, oil flows through the inlet 52 and passes through the bore 88.

Figure 6:
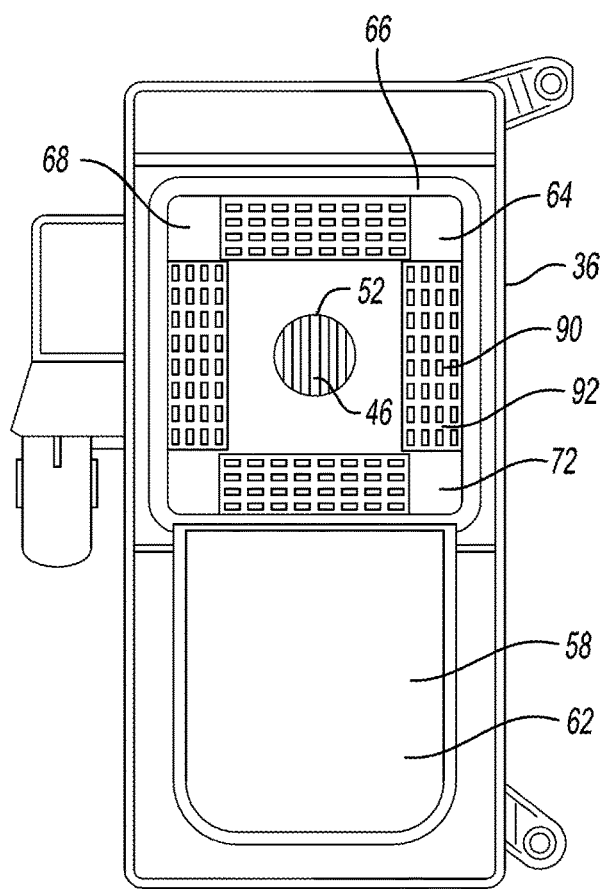
FIG. 6 is a bottom view of the oil filter of FIG. 2.

Referring to FIGS. 3 and 6, the bottom side 62 of the main portion 58 is spaced from an upper surface 94 of the oil pan at a first distance D1 that is greater than a distance D2 defined between the bottom side 72 of the sunken portion 64 and the upper surface 94 of the oil pan 30. This places the magnets 82 closer to the oil pan 30 so that oil flowing between the sunken portion 64 and the upper surface 94 is subjected to the magnetic field. The magnets 82 are size such that the magnetic field extends at least to the oil pan 30 in the downward direction. This allows the magnets 82 to remove fines from oil that is flowing both above the magnets 82, i.e., within the filter, and below the magnets, i.e., below the filter.

The bottom side 72 of the sunken portion 64 may include fine traps 90 that prevent fluid forces from dislodging the collected fines from the bottom cover 40. The traps 90 are located below the magnets 82 and within the magnetic field of the magnets. The traps 90 include trap features that trap the fines. The traps 90 may be integrally formed with the bottom 68. The trap features may be ridges 92 that project from the bottom side 72 to define grooves that trap the fines therein. The traps 90 may be arranged to surround the inlet 52. In some embodiments the traps may be a single continuous trap that encircles the inlet. See FIG. 8 for example.

Figure 7:
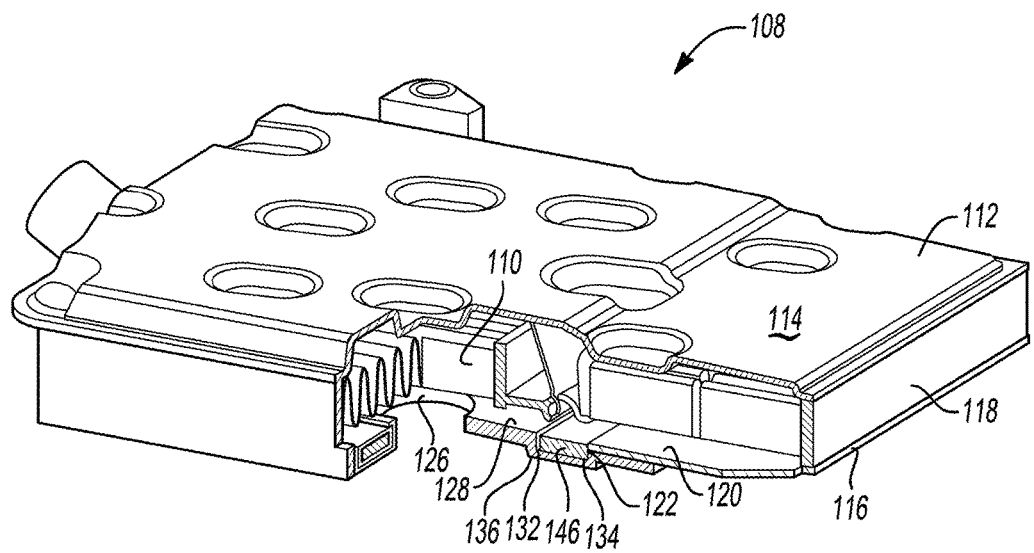
FIG. 7 is a perspective view of another oil filter for a transmission.
Figure 8:
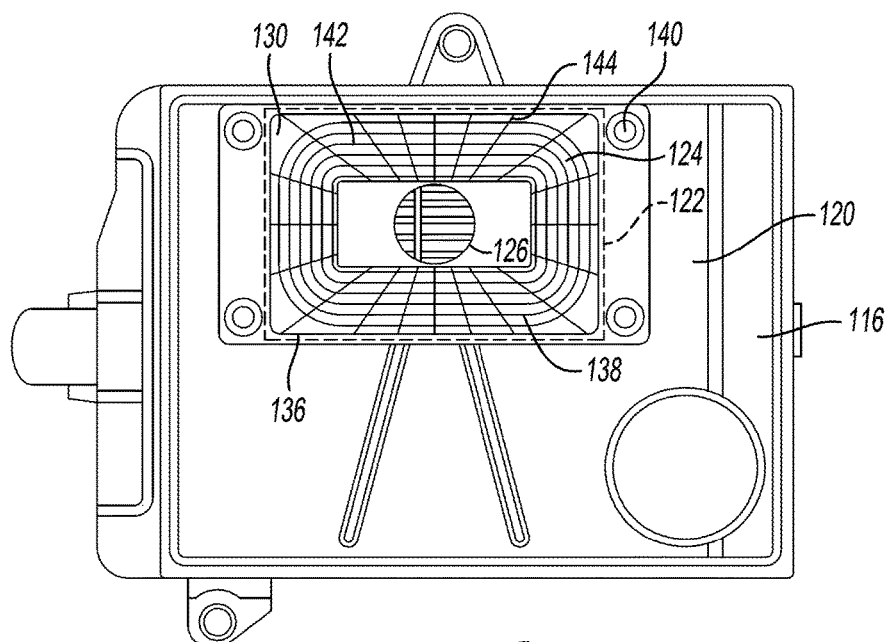
FIG. 8 is a bottom view of the bottom cover of the oil filter of FIG. 7.

Referring to FIGS. 7 and 8, another transmission oil filter 108 includes a housing 112 having a top cover 114, a bottom cover 116, and sidewalls 118 extending therebetween. The filter media 110 is disposed within the housing 112 to filter fines and contaminates from the oil. The bottom cover 116 includes a main portion 120 that defines an opening 122. A magnet carrier 124 is connected to the main portion 120 to cover the opening 122. The magnet carrier 124 may be attached to the main portion 120 by one or more fasteners 140. The fasteners may be bolts or screws. Alternatively, the magnet carrier 124 may be glued to the main portion 120. In some embodiments, the magnet carrier 124 may be integrally formed with the main portion 120.

The magnet carrier 124 includes a top side 128, a bottom side 130, and an inlet 126 extending between the top side and the bottom side. One or more magnet pockets 132 are disposed around the inlet 126. Each of the pockets 132 defines a recess 134 that receives a magnet 146 and a projection 136 that extends downwardly from the bottom side 130. One or more fine traps 138 are disposed on a bottom surface of the projection 136. The fine traps 138 may include ovular ridges 142 that encircle the inlet 126 and radial ridges 144 that intersect with the ridges 142 to create a grid-like pattern that traps fines attracted by the magnet 146.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation.

What is claimed is:

1. A transmission oil filter comprising:
    a housing including a bottom cover defining a top side, a bottom side, and an inlet;
    a filter disposed in the housing; and
    one or more magnets disposed on the top side surrounding the inlet so that oil passes by the one or more magnets when passing through the inlet, wherein the bottom side includes ridges disposed under the magnets to trap fines.

2. The transmission oil filter of claim 1, wherein the one or more magnets is a single magnet having a circular shape and defining a bore that encircles the inlet.

3. The transmission oil filter of claim 1, wherein the bottom cover includes a sunken portion that is recessed from a main portion, wherein the sunken portion includes a top surface supporting the one or more magnets and a bottom surface that defines the ridges, and the inlet is defined by the sunken portion and extends between the top and bottom surfaces.

4. The transmission oil filter of claim 3 further comprising one or more magnet pockets defined by the sunken portion, each of the magnet pockets receiving one of the one or more magnets therein.

5. The transmission oil filter of claim 1 further comprising a bracket that secures one of the magnets to the bottom cover.

6. The transmission oil filter of claim 1, wherein the ridges form a grid pattern on the bottom side.

7. The transmission oil filter of claim 1, wherein the one or more magnets are recessed into the top side.

8. The transmission oil filter of claim 1, wherein the housing further includes a top cover and a sidewall extending between the top cover and the bottom cover, and wherein the filter is disposed between the top cover and the bottom cover, and the sidewall defines an outlet.

9. A transmission comprising:
    a case;
    an oil pan attached to the case and defining a sump;
    an oil filter disposed in the sump and including a bottom cover defining a top surface, a bottom surface, and an inlet, wherein the bottom cover defines one or more magnet pockets that surround the inlet and are recessed from the top surface; and
    one or more magnets disposed in the pockets.

10. The transmission of claim 9, wherein the bottom surface defines ridges at a location under the magnets to trap fines.

11. The transmission of claim 10, wherein an upper surface of the oil pan is disposed within a magnetic field of the one or more magnets.

12. The transmission of claim 9 further comprising at least one retention feature that secures one of the magnets to the bottom cover.

13. The transmission of claim 9, wherein the one or more magnet pockets is a single magnet pocket that encircles the inlet, and wherein the one or more magnets is a single magnet having a circular shape that conforms with the shape of the single magnet pocket, wherein the single magnet defines a bore permitting oil to flow therethrough during operation of the transmission.

14. The transmission of claim 9, wherein the bottom cover includes a main portion and a sunken portion that defines the inlet, wherein the one or more magnet pockets are located on the sunken portion, and a bottom surface of the sunken portion defines ridges at a location under the magnets to trap fines.

15. The transmission of claim 9, wherein the oil filter further includes a filter media disposed above the top surface.

16. A transmission oil filter comprising:
    a rectangular housing including a top cover, sidewalls, and a bottom cover, the bottom cover having a main portion and a sunken portion that defines an inlet of the housing, wherein the sunken portion includes a top side defining magnet pockets that surround the inlet;
    a filter media disposed in the housing between the top and bottom covers and suspended above the sunken portion; and
    magnets disposed in the pockets and surrounding the inlet, wherein a bottom side of the sunken portion defines ridges disposed under the magnets.

17. The transmission oil filter of claim 16, wherein each of the pockets includes a sidewall extending upwardly from the top side.

18. The transmission oil filter of claim 16, wherein the sunken portion is recessed from the main portion such that a top surface of each of the magnets is flush or below a top surface of the main portion.

19. The transmission oil filter of claim 16 further comprising a retention feature connected between one of the magnets and the sunken portion to secure the magnet in a corresponding one of the pockets.

20. The transmission oil filter of claim 16, wherein the ridges includes ovular ridges that encircle the inlet and radial ridges that intersect the ovular ridges.

* * * * *